US009064544B2

(12) United States Patent
Sun

(10) Patent No.: US 9,064,544 B2
(45) Date of Patent: Jun. 23, 2015

(54) MOUNTING DEVICE FOR HARD DISK DRIVE

(71) Applicant: HON HAI PRECISION INDUSTRY CO., LTD., New Taipei (TW)

(72) Inventor: Zheng-Heng Sun, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 22 days.

(21) Appl. No.: 14/093,065

(22) Filed: Nov. 29, 2013

(65) Prior Publication Data

US 2014/0319312 A1  Oct. 30, 2014

(30) Foreign Application Priority Data

Apr. 24, 2013  (CN) .......................... 2013 1 01446636

(51) Int. Cl.
*F16M 13/00* (2006.01)
*G11B 33/08* (2006.01)
*G11B 33/12* (2006.01)

(52) U.S. Cl.
CPC .............. *G11B 33/08* (2013.01); *G11B 33/124* (2013.01)

(58) Field of Classification Search
CPC ............................... G11B 33/08; G11B 33/124
See application file for complete search history.

(56) References Cited

U.S. PATENT DOCUMENTS

| 6,196,516 | B1 * | 3/2001 | Lan .............................. 248/634 |
| 6,741,544 | B1 * | 5/2004 | Masaki et al. ................. 720/702 |
| 8,108,327 | B2 * | 1/2012 | Krebs ............................ 706/14 |
| 2005/0088778 | A1 * | 4/2005 | Chen et al. ................. 360/97.02 |
| 2006/0023416 | A1 * | 2/2006 | Chen ............................. 361/685 |
| 2007/0297129 | A1 * | 12/2007 | Liu et al. ....................... 361/685 |
| 2009/0031334 | A1 * | 1/2009 | Goodman et al. ............ 720/692 |
| 2009/0201605 | A1 * | 8/2009 | Lin ............................ 360/97.02 |
| 2012/0293945 | A1 * | 11/2012 | Wang et al. .............. 361/679.33 |

* cited by examiner

*Primary Examiner* — Amy Sterling
(74) *Attorney, Agent, or Firm* — Novak Druce Connolly Bove + Quigg LLP

(57) ABSTRACT

A mounting device for mounting a hard disk drive (HDD), includes a number of retaining members each including a neck portion and a head portion, an elastic latching member including a stop portion, and a number of vibration attenuation members fixed on a bottom wall of the HDD. Each vibration attenuation member includes a top portion, a bottom portion defining a mounting hole, and two elastic portions. The mounting hole defines a first hole and a second hole smaller in width than the first hole and communicating with the first hole. The retaining members are inserted into the first holes of the corresponding mounting holes, the HDD is moved until the neck portions of the retaining members engage in the second holes of the plurality of vibration attenuation members. The stop portion abuts against an end wall of the HDD.

7 Claims, 6 Drawing Sheets

MOUNTING DEVICE FOR HARD DISK DRIVE

BACKGROUND

1. Technical Field

The present disclosure relates to a device for mounting a hard disk drive (HDD).

2. Description of Related Art

Hard disk drives (HDDs) are fragile and delicate parts. Vibration generated from transporting, or the use of, the HDDs may damage the HDDs, or affect the service lives of the HDDs. Therefore, there is room for improvement in the art of mounting the HDDs.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
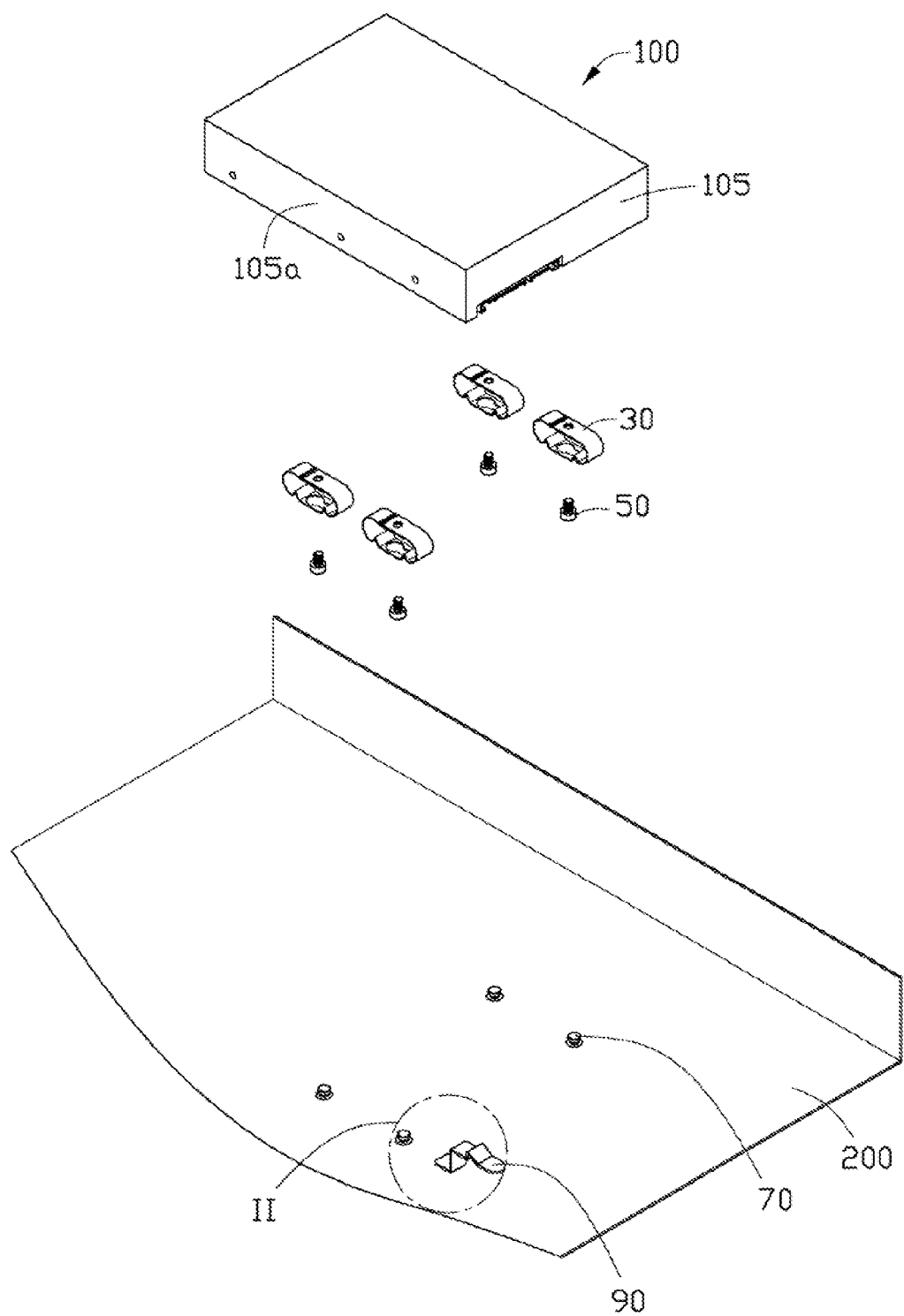
FIG. 1 is an exploded, isometric view of an exemplary embodiment of a mounting device together with a hard disk drive (HDD), wherein the mounting device includes a vibration attenuation member.
Figure 2:
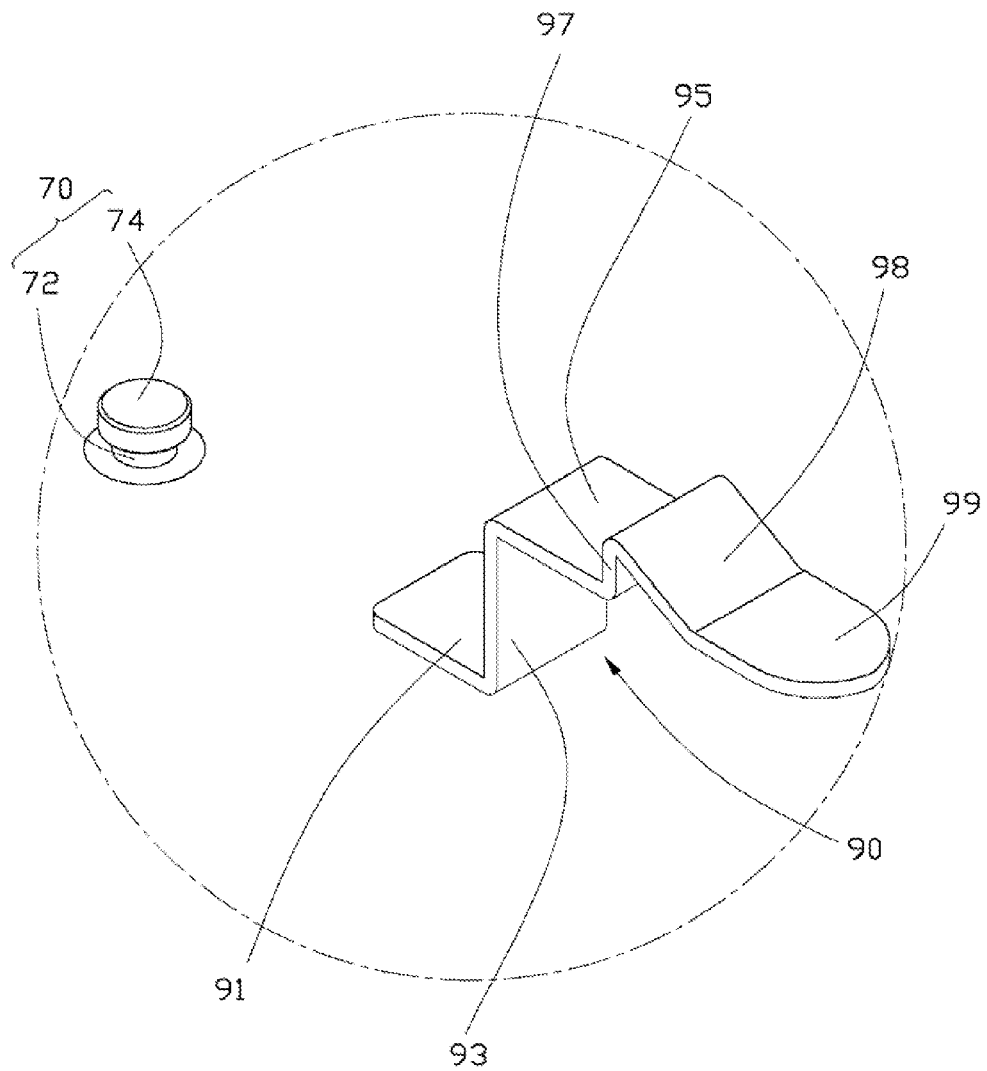
FIG. 2 is an enlarged view of the circled portion II of FIG. 1.

FIGS. 1 and 2 show an exemplary embodiment of a mounting device for mounting a hard disk drive (HDD) 10 includes a fastening plate 200, four vibration attenuation members 30, four screws 50, and an elastic latching member 90 fixed to the fastening plate 200.

Four retaining members 70 extend up from the fastening plate 200, and are arranged in a rectangle. Each retaining member 70 is cylindrical, and includes a neck portion 72 perpendicularly up from the fastening plate 200 and a head portion 74 formed on a top end of the neck portion 72. A diameter of the neck portion 72 is less than a diameter of the head portion 74.

The latching member 90 is set on the fastening plate 200 and adjacent to a side of the retaining members 70. The latching member 90 includes a fixing piece 91 fixed to the fastening plate 200. A supporting piece 93 extending up from one end of the fixing piece 91, as well as an abutting piece 95 extending from a top side of the supporting piece 93 and parallel to the fastening plate 200. A stop portion 97 extending up from a side of the abutting piece 95 away from the supporting piece 93, a connection portion 98 slantingly extending outward and downward from the top side of the stop portion 97. In addition, an operation portion 99 extending in a direction parallel to the fastening plate 200 from a side of the connection portion 98 opposite to the stop portion 97.

Figure 3:
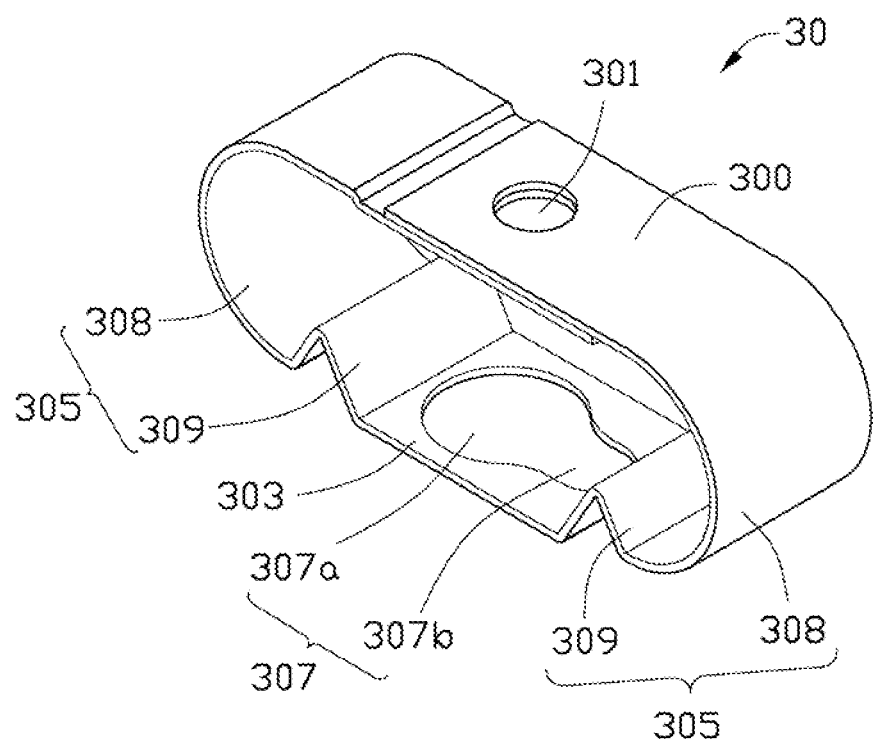
FIG. 3 is an enlarged view of the vibration attenuation member of FIG. 1.
Figure 4:
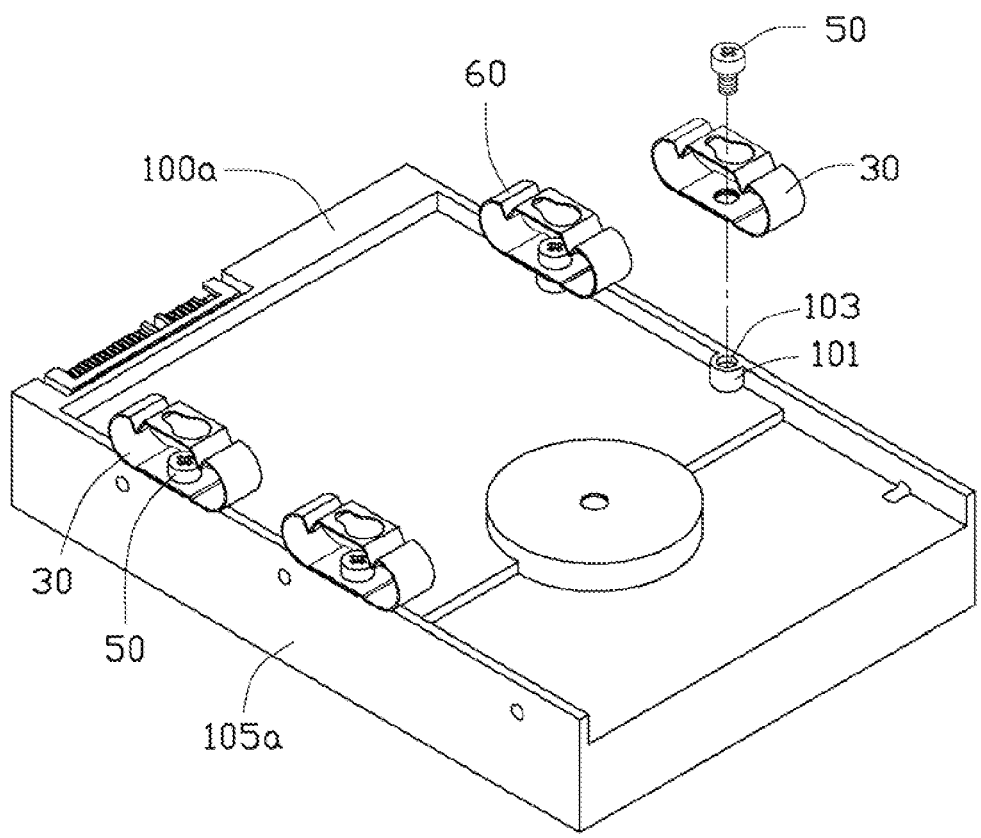
FIG. 4 is an assembled, inverted view of the HDD and the vibration attenuation member of FIG. 1.

FIGS. 3 and 4 show that, the HDD 100 includes a bottom wall 100a, a sidewall 105a extending up from a side of the bottom wall 100a, and an end wall 105 extending up from a rear end of the bottom wall 100a. Four columns 101 protrude from the bottom wall 100a, and each column 101 axially defines a screw hole 103.

Each vibration attenuation member 30 is an elliptic ring, which includes a top portion 300, a bottom portion 303 parallel to the top portion 300, and two elastic portions 305 connected between opposite ends of the top portion 300 and the bottom portion 303.

The top portion 303 defines a through hole 301. The bottom portion 303 defines a mounting hole 307. The mounting hole 307 includes a first hole 307a, and a second hole 307b less than the first hole 307a in width and communicating with the first hole 307a. Each elastic portion 305 includes a C-shaped elastic piece 308 connected to the top portion 300, and a V-shaped bending portion 309 connected between the bottom portion 303 and the elastic piece 308.

Figure 5:
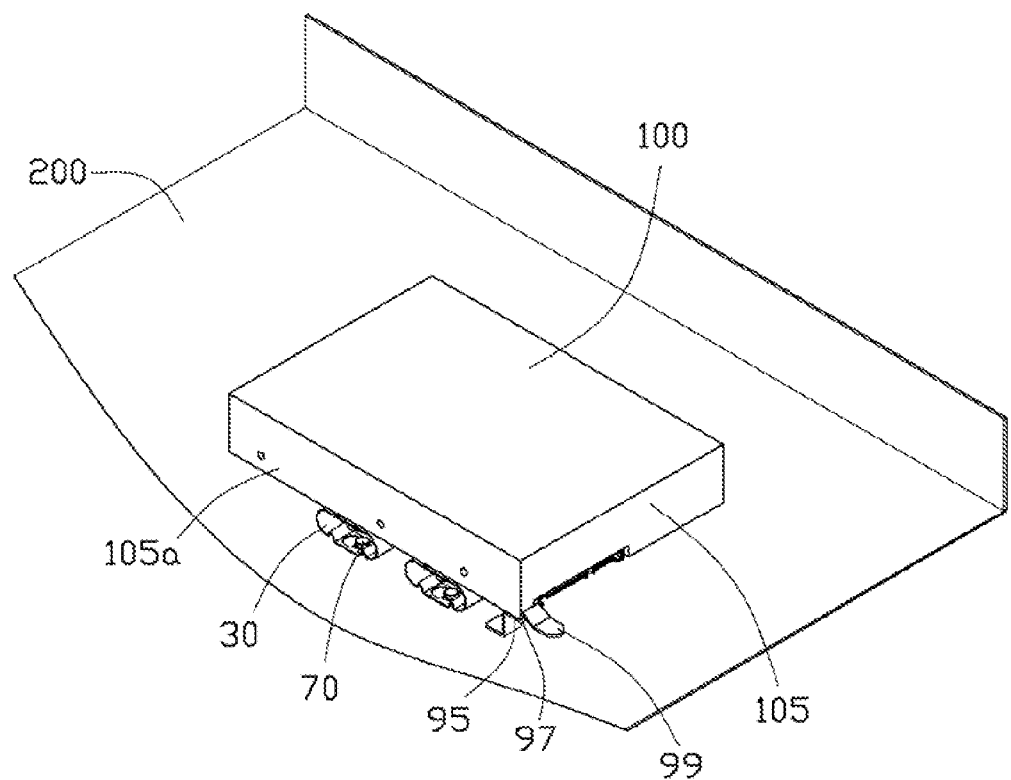
FIG. 5 is an assembled, isometric view of FIG. 1, showing the mounting device in a locking state.
Figure 6:
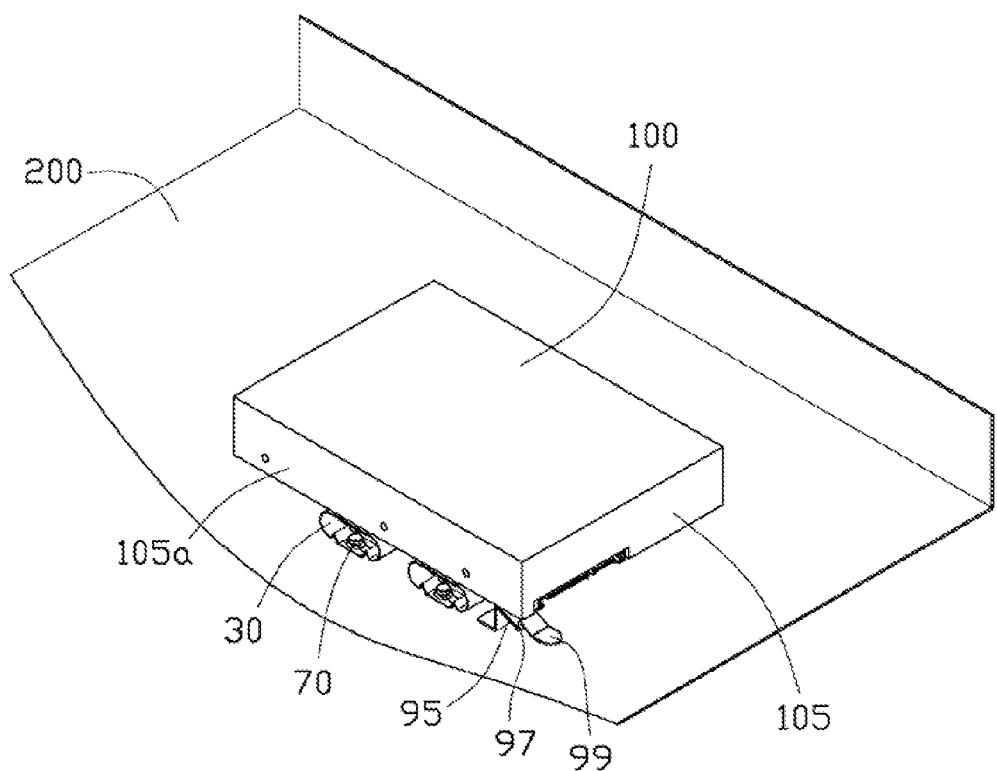
FIG. 6 is similar to FIG. 5, but showing the mounting device in an unlocking state.

FIGS. 4 and 5 show that in assembly, the screws 50 extend through the corresponding through holes 301 and engage in the corresponding screw holes 103, to fasten the vibration attenuation members 30 to the columns 101 of the HDD 100. The bottom wall 100a of the HDD 100 is placed above the fastening plate 200, and the mounting holes 307 are aligned with the corresponding retaining members 70. The second holes 307b are adjacent to the latching member 90. The HDD 100 together with the vibration attenuation members 30 is manipulated down to allow the head portions 74 of the retaining members 70 to enter the first holes 307a. The HDD 100 together with the vibration attenuation members 30 is slid to engage the neck portions 72 of the retaining members 70 in the second holes 307b. At the same time, the bottom wall 100a of the HDD 100 adjacent to the sidewall 105a and the end wall 105 supported on and abut against the abutting piece 95, and the end wall 105 of the HDD 100 abuts against the stop portion 97. The stop portion 97 can stop the retaining members 70 from disengaging from the second holes 307b. Therefore, the HDD 100 is fixed to the fastening plate 200. When the HDD 100 and the fastening plate 200 are subjected to vibrations or shocks, the vibration attenuation member 30 can be deformed to partially absorb the vibration energy.

In disassembly, the operation portion 99 is manipulated down to let the stop portion 97 disengage from the end wall 105 of the HDD 100. The HDD 100 is slid in the opposite direction, until the neck portions 72 of the retaining members 70 enter the first holes 307a. Therefore, the HDD 100 can be readily moved up to disengage from the fastening plate 200.

It is believed that the present embodiments and their advantages will be understood from the foregoing description, and various changes may be made thereto without departing from the spirit and scope of the description or sacrificing all of their material advantages, the examples hereinbefore described merely being exemplary embodiments.

What is claimed is:

1. A mounting device for mounting a hard disk drive (HDD), comprising:
   a fastening plate;
   a plurality of retaining members, each comprising a neck portion extending up from the fastening plate, and a head portion formed on a top end of the neck portion;

an elastic latching member fixed on the fastening plate, and comprising a stop portion; and a plurality of vibration attenuation members, each vibration attenuation member comprising a top portion, a bottom portion which defines a mounting hole, and two elastic portions connected between opposite ends of the top portion and the bottom portion, the mounting hole comprising a first hole and a second hole less than the first hole in width and communicated with the first hole;

wherein, in mounting the HDDs, the plurality of vibration attenuation members are fixed on a bottom wall of the HDD, the head portions of the plurality of retaining members are respectively inserted into the first holes of the mounting holes, the HDD is then moved until the neck portions of the plurality of retaining members engage in the second holes of the plurality of vibration attenuation members, and the stop portion abuts against an end wall of the HDD.

2. The mounting device of claim 1, wherein the top portion defines a through hole, a plurality of columns is protruded from the bottom wall of the HDD, and each column axially defines a screw hole, a plurality of screws extends through the corresponding through holes and engage in the corresponding screw holes, to fix the plurality of vibration attenuation members to the HDD.

3. The mounting device of claim 1, wherein the elastic portions each comprise an elastic piece connected to the top portion, and a bending portion connected between the bottom portion and the elastic piece.

4. The mounting device of claim 3, wherein the elastic piece is C-shaped.

5. The mounting device of claim 3, wherein the bending portion is V-shaped.

6. The mounting device of claim 1, wherein the latching member further comprises a fixing piece fixed to the chassis, a supporting piece extending up from the fixing piece, and an abutting piece extending from a top of the supporting piece and parallel to the fastening plate to support and abut against the bottom wall of the HDD, the stop portion is extended up from the abutting piece.

7. The mounting device of claim 6, wherein the latching member further comprises a connection portion slantingly extending outward and downward from a top of the stop portion, and an operation portion parallel to the fixing piece and connected to a side of the connection portion opposite to the stop portion.

* * * * *